United States Patent
Jonas (10) Patent No.: US 8,204,831 B2
(45) Date of Patent: Jun. 19, 2012

(54) POST-ANONYMOUS FUZZY COMPARISONS WITHOUT THE USE OF PRE-ANONYMIZATION VARIANTS

(75) Inventor: Jeffrey J. Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 11/559,209

(22) Filed: Nov. 13, 2006

(65) Prior Publication Data

US 2008/0114991 A1 May 15, 2008

(51) Int. Cl.
*G06F 21/00* (2006.01)
(52) U.S. Cl. ............... 705/50; 705/51; 705/57; 705/67; 705/75
(58) Field of Classification Search .............. 705/50, 705/51, 57, 67, 75
See application file for complete search history.

(56) References Cited

U.S. PATENT DOCUMENTS

| | | |
|---|---|---|
| 1,261,167 A | 4/1918 | Russell |
| 3,659,085 A | 4/1972 | Porter |
| 3,793,634 A | 2/1974 | Heller et al. |
| 4,138,057 A | 2/1979 | Atalla et al. |
| 4,232,313 A | 11/1980 | Fleishman |
| 4,981,370 A | 1/1991 | Dziewit et al. |
| 5,003,598 A | 3/1991 | Kunstadt |
| 5,010,478 A | 4/1991 | Deran |
| 5,229,764 A | 7/1993 | Matchett et al. |
| 5,335,280 A * | 8/1994 | Vobach ..................... 380/42 |
| 5,384,849 A | 1/1995 | Jeong |
| 5,403,639 A | 4/1995 | Belsan et al. |
| 5,454,101 A | 9/1995 | Mackay et al. |
| 5,534,855 A | 7/1996 | Shockley et al. |
| 5,555,409 A | 9/1996 | Leenstra et al. |
| 5,560,006 A | 9/1996 | Layden et al. |
| 5,600,835 A * | 2/1997 | Garland et al. ............... 1/1 |
| 5,608,907 A | 3/1997 | Fehskens et al. |
| 5,659,731 A | 8/1997 | Gustafson |
| 5,675,785 A | 10/1997 | Hall et al. |
| 5,742,807 A | 4/1998 | Masinter |
| 5,758,343 A | 5/1998 | Vigil et al. |
| 5,764,977 A | 6/1998 | Oulid-Aissa et al. |

(Continued)

FOREIGN PATENT DOCUMENTS

CN    1641716    7/2005

(Continued)

OTHER PUBLICATIONS

Chinese Office Action dated Jun. 19, 2009, Application No. 20071018090X with English translation of First Examination Report.

(Continued)

*Primary Examiner* — Pierre E Elisca
(74) *Attorney, Agent, or Firm* — Gates & Cooper LLP (57) ABSTRACT

A method, apparatus, and article of manufacture for processing data. The method, apparatus and article of manufacture preferably comprise the steps of: (a) receiving a record having a plurality of identifiers into a computer system, the record corresponding to an entity; (b) encrypting one or more of the identifiers in the record to form an encrypted record; (c) applying one or more encrypted variants to the encrypted record based on the encrypted identifiers and pre-computed encrypted synonyms; and (d) comparing the encrypted record to previously stored data using the encrypted identifiers and the encrypted variants in order to the match or associate the encrypted record with the previously stored data.

27 Claims, 4 Drawing Sheets

U.S. PATENT DOCUMENTS

| | | |
|---|---|---|
| 5,778,375 A | 7/1998 | Hecht |
| 5,781,911 A | 7/1998 | Young et al. |
| 5,784,464 A | 7/1998 | Akiyama et al. |
| 5,794,246 A | 8/1998 | Sankaran et al. |
| 5,799,309 A | 8/1998 | Srinivasan |
| 5,819,263 A | 10/1998 | Bromley et al. |
| 5,848,373 A | 12/1998 | Delorme et al. |
| 5,878,416 A | 3/1999 | Harris et al. |
| 5,892,828 A | 4/1999 | Perlman |
| 5,897,637 A | 4/1999 | Guha |
| 5,933,831 A | 8/1999 | Jorgensen |
| 5,991,408 A | 11/1999 | Pearson et al. |
| 5,991,733 A | 11/1999 | Aleia et al. |
| 5,991,758 A | 11/1999 | Ellard |
| 5,991,765 A | 11/1999 | Vethe |
| 5,995,097 A | 11/1999 | Tokumine et al. |
| 5,995,973 A | 11/1999 | Daudenarde |
| 6,014,670 A | 1/2000 | Zamanian et al. |
| 6,032,158 A | 2/2000 | Mukhopadhyay et al. |
| 6,035,295 A | 3/2000 | Klein |
| 6,035,300 A | 3/2000 | Cason et al. |
| 6,035,306 A | 3/2000 | Lowenthal et al. |
| 6,041,410 A | 3/2000 | Hsu et al. |
| 6,044,378 A | 3/2000 | Gladney |
| 6,049,805 A | 4/2000 | Drucker et al. |
| 6,052,693 A | 4/2000 | Smith et al. |
| 6,058,477 A | 5/2000 | Kusakabe et al. |
| 6,065,001 A | 5/2000 | Ohkubo et al. |
| 6,073,140 A | 6/2000 | Morgan et al. |
| 6,076,167 A | 6/2000 | Borza |
| 6,092,199 A | 7/2000 | Dutcher et al. |
| 6,122,641 A | 9/2000 | Williamson et al. |
| 6,122,757 A | 9/2000 | Kelley |
| 6,160,903 A | 12/2000 | Hamid et al. |
| 6,167,517 A | 12/2000 | Gilchrist et al. |
| 6,185,557 B1 | 2/2001 | Liu |
| 6,189,016 B1 | 2/2001 | Cabrera et al. |
| 6,202,151 B1 | 3/2001 | Musgrave et al. |
| 6,208,990 B1 | 3/2001 | Suresh et al. |
| 6,240,409 B1 | 5/2001 | Aiken |
| 6,249,784 B1 | 6/2001 | Macke et al. |
| 6,263,446 B1 | 7/2001 | Kausik et al. |
| 6,272,495 B1 | 8/2001 | Hetherington |
| 6,289,334 B1 | 9/2001 | Reiner et al. |
| 6,292,900 B1 | 9/2001 | Ngo et al. |
| 6,310,966 B1 | 10/2001 | Dulude et al. |
| 6,317,834 B1 | 11/2001 | Gennaro et al. |
| 6,334,132 B1 | 12/2001 | Weeks |
| 6,339,775 B1 | 1/2002 | Zamanlan et al. |
| 6,357,004 B1 | 3/2002 | Davis |
| 6,385,604 B1 | 5/2002 | Bakalash et al. |
| 6,397,224 B1 | 5/2002 | Zubeldia et al. |
| 6,418,450 B2 | 7/2002 | Daudenarde |
| 6,446,210 B1 | 9/2002 | Borza |
| 6,460,037 B1 | 10/2002 | Weiss et al. |
| 6,523,041 B1 | 2/2003 | Morgan et al. |
| 6,674,860 B1 | 1/2004 | Pirila |
| 6,684,334 B1 | 1/2004 | Abraham |
| 6,690,820 B2 | 2/2004 | Lees et al. |
| 6,697,947 B1 | 2/2004 | Matyas, Jr. et al. |
| 6,725,243 B2 | 4/2004 | Snapp |
| 6,734,783 B1 | 5/2004 | Anbai |
| 6,743,022 B1 | 6/2004 | Sarel |
| 6,757,689 B2 | 6/2004 | Battas et al. |
| 6,788,779 B2 | 9/2004 | Ostapchuck |
| 6,801,915 B1 | 10/2004 | Mack |
| 6,810,405 B1 | 10/2004 | LaRue et al. |
| 6,819,797 B1 | 11/2004 | Smith |
| 6,845,159 B1 | 1/2005 | Domstedt et al. |
| 6,865,561 B1 | 3/2005 | Allport et al. |
| 6,886,747 B2 | 5/2005 | Snapp |
| 6,912,549 B2 | 6/2005 | Rotter et al. |
| 6,931,392 B1 | 8/2005 | Skeen |
| 6,948,062 B1 | 9/2005 | Clapper |
| 6,954,757 B2 | 10/2005 | Zargham et al. |
| 6,968,338 B1 | 11/2005 | Gawdiak et al. |
| 7,003,560 B1 | 2/2006 | Mullen et al. |
| 7,007,168 B2 | 2/2006 | Kubo et al. |
| 7,024,562 B1 | 4/2006 | Flink et al. |
| 7,046,802 B2 | 5/2006 | Rogaway |
| 7,047,418 B1 | 5/2006 | Ferren et al. |
| 7,092,951 B1 | 8/2006 | Luo et al. |
| 7,103,778 B2 | 9/2006 | Kon et al. |
| 7,124,305 B2 | 10/2006 | Margolus et al. |
| 7,143,289 B2 | 11/2006 | Denning et al. |
| 7,149,782 B2 | 12/2006 | Sommerer |
| 7,177,426 B1 | 2/2007 | Dube |
| 7,188,362 B2 | 3/2007 | Brandys |
| 7,194,484 B2 | 3/2007 | Aoki |
| 7,200,549 B1 | 4/2007 | Fujii et al. |
| 7,200,602 B2 | 4/2007 | Jonas |
| 7,228,335 B2 | 6/2007 | Caughey |
| 7,228,437 B2 | 6/2007 | Spagna et al. |
| 7,240,027 B2 | 7/2007 | McConnell et al. |
| 7,249,257 B2 | 7/2007 | Brundage et al. |
| 7,254,839 B2 | 8/2007 | Fahraeus et al. |
| 7,412,462 B2 | 8/2008 | Margolus et al. |
| 7,512,234 B2 | 3/2009 | McDonnell et al. |
| 7,599,930 B1 | 10/2009 | Burns et al. |
| 7,702,919 B2 | 4/2010 | Jonas |
| 2001/0049690 A1 | 12/2001 | McConnell et al. |
| 2002/0023088 A1 | 2/2002 | Thwaites |
| 2002/0037082 A1 | 3/2002 | Aoki et al. |
| 2002/0038308 A1 | 3/2002 | Cappi |
| 2002/0043566 A1 | 4/2002 | Goodman et al. |
| 2002/0073099 A1* | 6/2002 | Gilbert et al. ............... 707/104.1 |
| 2002/0077898 A1 | 6/2002 | Koulouris |
| 2002/0091678 A1 | 7/2002 | Miller et al. |
| 2002/0105144 A1* | 8/2002 | Tait et al. ....................... 273/292 |
| 2002/0107864 A1 | 8/2002 | Battas et al. |
| 2002/0107957 A1 | 8/2002 | Zargham et al. |
| 2002/0112177 A1 | 8/2002 | Voltmer et al. |
| 2002/0124176 A1 | 9/2002 | Epstein |
| 2002/0165903 A1 | 11/2002 | Zargham et al. |
| 2002/0184509 A1 | 12/2002 | Scheidt et al. |
| 2003/0030733 A1 | 2/2003 | Seaman et al. |
| 2003/0091218 A1 | 5/2003 | Hamid |
| 2003/0097380 A1 | 5/2003 | Mulhern et al. |
| 2003/0108202 A1 | 6/2003 | Clapper |
| 2003/0115475 A1 | 6/2003 | Russo et al. |
| 2003/0154194 A1 | 8/2003 | Jonas |
| 2003/0182018 A1 | 9/2003 | Snapp |
| 2003/0182568 A1 | 9/2003 | Snapp et al. |
| 2003/0191739 A1 | 10/2003 | Chatterjee et al. |
| 2003/0200447 A1 | 10/2003 | Sjoblom |
| 2004/0002816 A1 | 1/2004 | Milosavljevic |
| 2004/0007616 A1 | 1/2004 | Snapp |
| 2004/0015706 A1 | 1/2004 | Eshghi et al. |
| 2004/0019518 A1 | 1/2004 | Abraham et al. |
| 2004/0049682 A1 | 3/2004 | Wilson et al. |
| 2004/0128274 A1 | 7/2004 | Snapp et al. |
| 2004/0143724 A1 | 7/2004 | Jacob et al. |
| 2004/0162802 A1 | 8/2004 | Jonas |
| 2004/0162984 A1 | 8/2004 | Freeman et al. |
| 2004/0193893 A1 | 9/2004 | Braithwaite et al. |
| 2004/0210763 A1 | 10/2004 | Jonas |
| 2004/0236720 A1 | 11/2004 | Basso et al. |
| 2005/0060556 A1 | 3/2005 | Jonas |
| 2005/0066182 A1 | 3/2005 | Jonas et al. |
| 2005/0097318 A1 | 5/2005 | Bolosky et al. |
| 2005/0165852 A1 | 7/2005 | Albornoz et al. |
| 2005/0182777 A1 | 8/2005 | Block et al. |
| 2006/0010119 A1 | 1/2006 | Jonas |
| 2007/0038664 A1 | 2/2007 | Jonas |
| 2007/0198275 A1 | 8/2007 | Malden et al. |
| 2007/0239705 A1 | 10/2007 | Jonas et al. |
| 2010/0153738 A1 | 6/2010 | Jonas |
| 2010/0192220 A1* | 7/2010 | Heizmann et al. ............... 726/19 |

FOREIGN PATENT DOCUMENTS

| | | |
|---|---|---|
| CN | 1757188 | 4/2006 |
| CN | 1839384 | 9/2006 |
| DE | 19715664 | 10/1988 |
| EP | 1130513 | 9/2001 |
| JP | 63282838 | 11/1988 |
| JP | 2012563 | 1/1990 |
| JP | 03-017792 | 1/1991 |

| | | |
|---|---|---|
| JP | 04-237373 | 8/1992 |
| JP | 4185188 | 10/1992 |
| JP | 05-127959 | 5/1993 |
| JP | 05-250416 | 9/1993 |
| JP | 10154231 | 6/1998 |
| JP | 10275158 | 10/1998 |
| JP | 10327142 | 12/1998 |
| JP | 11184884 | 7/1999 |
| JP | 11224236 | 8/1999 |
| JP | 11265432 | 9/1999 |
| JP | 11296532 | 10/1999 |
| JP | 2000339351 | 12/2000 |
| JP | 2001117940 | 4/2001 |
| JP | 2001325425 | 11/2001 |
| JP | 2001525960 | 12/2001 |
| JP | 2002222170 | 8/2002 |
| JP | 2002334114 | 11/2002 |
| JP | 2008305662 | 12/2008 |
| JP | 2009204401 | 9/2009 |
| WO | 98/52317 | 11/1998 |
| WO | 99/14692 | 3/1999 |
| WO | 99/40702 | 8/1999 |
| WO | 99/64970 | 12/1999 |
| WO | 01/22285 | 3/2001 |
| WO | 01/29780 | 4/2001 |

OTHER PUBLICATIONS

Dempsey et al., "Technologies That Can Protect Privacy as Information is Shared to Combat Terrorism," Legal Memorandum, No. 11, May 26, 2004, pp. 1-12.
Hundepool, A., "The CASC Project; Summary," Computation Aspects of Statistical Confidentiality, Feb. 2005, pp. 1-22.
Hanming Tu, Pattern Recognition and Geographical Data Standarization, The Proceedings of Geoinformatics '99 Conference, Jun. 19-21, 1999, pp. 1-7.
Matchware Technologies Inc., AUTOSTAN, Generalized Standardization System, User's Manual Version 4.6, Feb. 11, 1998, pp. 1-90.
Vality Technology Incorporated, INTEGRITY, Data Re-enginering Environment, SUPERSTAN User Guide Version 2.5, Mar. 1998.
Supplemental European Search Report dated Sep. 2, 2010, Application No. EP 03 79 6368.
"Oracle Warehouse Builder: A Technical Overview," Oracle Technical White Paper, Jan. 1, 2000, pp. 1-21.
Garcia et al., "Immunization Registries DeDuplication and Record Matching," White Paper, Internet citation, 1999, www.immunizationregistries.com/white_papers/WHP006A_deduplication_recordmatching.pdf, pp. 1-11.
Hoshino, "Inter-database relationships discovery and retrieval method for multidatabase environment," Jul. 10, 1998, vol. 98, No. 58, pp. 389-396 (with English Abstract).
Munakata, "Integration of heterogenous information sources," Institute of Systems Control and Information Engineers, Dec. 15, 1996, vol. 40, No. 12, pp. 14-21 (with English Abstract).
Rahm et al., "Data Cleaning: Problems and Current Approaches" Quarterly Bulletin of the Computer Science of the IEEE Technical Committee on Data Engineering, Dec. 1, 2000, pp. 1-11.
Ratha et al., "Enhancing security and privacy in biometric-based authentication systems," IBM Systems Journal, Aug. 2001, pp. 614-634.
Sattler et al., "A Data Preparation Framework Based on a Multidatabase Language," Database Engineering & Applications, 2001, International Symposium on Jul. 16-18, 2001, pp. 219-228.
Suzuki et al., "Fragment view-heterogeneity resolution method in multi-database without global view," The Institute of Electronics Information and Communication Engineers, Tech Report of IICE, 1997, pp. 25-30 (with English Abstract).
Takezaki et al., "A method of database linkage between telephone directory and residential map," NTT Electrical Communication Lab, National Convention Record 1987, Mar. 26-29, p. 1-111 (with English Abstract). (No. 1).
Takezaki et al., "A method of database linkage between telephone directory and residential map," NTT Electrical Communication Lab, National Convention Record 1987, Mar. 26-29, No. 1, p. 6-91 (with English Abstract). (No. 2).
Whalen et al , "Linking Client Records from Substance Abuse, Mental Health and Medicaid State Agencies," Internet citation, Jul. 2001, www.samhsa.gov/centers/csat/content/idbse/linking.pdf, pp. 9-13.
Jaro, "Record Linkage Research and the Calibration of Record Linkage Algorithms", U.S. Bureau of the Census, Report No: rr-84/27 (Aug. 9, 1984).
DeWitt et al., *An Evaluation of Non-Equijoin Algorithms*, Proc. $17^{th}$ Intl. Conf. on Very Large Data Bases, Sep. 1991, pp. 443-452.
Verykios at al., *A Bayesian decision model for cost optimal record matching*, The VLDB Journal, 2000, vol. 12, Nos. 28-450, pp. 28-40.
Yuwono et al., *Search and Ranking Algorithms for Locating Resources on the World Wide Web*, Intl. Conf. on Data Engineering, 1996, pp. 164-171.
Hou et al., *Medical Image Retrieval by Spatial Features*, 1992 IEEE Intl. Conf. on Systems, Man and Cybernetics, Oct. 1992, vol. 1, pp. 1364-1369.
Callan et al., *Searching Distributed Collections With Inference Networks*, Proc. $18^{th}$ Annual Intl. ACM SIGIR Conf. on R&D in Information Retrieval, Jul. 9-13, 1995, pp. 21-28.
DeFazio et al., *Integrating IR and RDBMS Using Cooperative Indexing*, Proc. $18^{th}$ Annual Intl. ACM SIGIR Conf. on R&D in Information Retrieval, Jul. 9-13, 1995, pp. 84-92.
Sclaroff et al., *ImageRover: A Content-Based Image Browser for the World Wide Web*, IEEE Workshop on Content-Based Access of Image and Video Libraries, Jun. 1997, pp. 2-9.
Knoblock, *Searching the World Wide Web*, Trends & Controversies, Jan.-Feb. 1997, pp. 8-24.
Amba et al., *Automatic Linking of Thesauri*, Proc. $18^{th}$ Annual Intl. ACM SIGIR Conf. on R&D in Information Retrieval, Jul. 9-13, 1995, pp. 181-188.
Gelbart et al., *Toward a Comprehensive Legal Information Retrieval System*, Database and Expert Systems Applns., Proc. Intl. Conf. in Vienna, Austria, 1990, pp. 121-125.
Kimoto et al., *Construction of a Dynamic Thesaurus and Its Use for Associated Information Retrieval*, Proc.$^{th}$ Intl. Conf. on R&D in Information Retrieval, Sep. 5-7, 1990, pp. 227-241.
Findler, *Information Retrieval Systems*, An Artificial Intelligence Technique for Information and Fact Retrieval, 1991.
Yearwood et al., *Retrieving cases for treatment advice in nursing using text representation and structured text retrieval*, Artificial Intelligence in Medicine, Jan. 1997, vol. 9, No. 1, pp. 79-98.
Batory et al., *Implementation Concepts for an Extensible Data Model and Data Language*, acm Transactions on Database Systems, Sep. 1988, vol. 13, No. 3, pp. 231-262.
Labio at al., The WHIPS Prototype for Data Warehouse Creation and Maintenance, 1997, pp. 557-559.
Haisten, *Information Discovery in the Data Warehouse*, InfoDB, vol. 9, No. 6, pp. 14-25.
Suardi et al., *Execution of Extended Multidatabase SQL*, 1993, pp. 641-650.
Romberg, *Meta-Entities Keeping Pace with Change*, Database Programming & Design; Jan. 1995, pp. 54-59.
Fellegi, *Tutorial on the Fellegi-Sunter Model for Record Linkage*, Section II: Overview of Applications and Introduction to Theory, pp. 127-178.
Crane et al., "Project LINK-LINK: An Interactive Database of Administrative Record Linkage Studies", National Center for Education Statistics and U.S. Department of Agriculture, Record Linkage Techniques—1985: Proceedings of the Workshop on Exact Matching Methodologies, Arlington, VA, pp. 311-315 (May 9-10, 1985).
Childers et al., *The IRS/Census Direct Match Study—Final Report*, Bureau of the Census—Statistical Research Division Report Series, Aug. 1, 1984, pp. 1-22.
LaPlant Jr., *Generalized Data Standardization Program Generator (GENSTAN) Program Generation System Part II*, Bureau of the Census Statistical Research Division Report Series, Jul. 22, 1986.
LaPlant Jr., *User's Guide for the Generalized Record Linkage Program Generator (GENLINK) SRD Program Generator System User's Guide: Part III*, Bureau of the Census Statistical Research Division Report Series, Sep. 1, 1986.
Winkler et al., *An Application of the Fellegi-Sunter Model of Record Linkage to the 1990 U.S. Decennial Census*.

Hemandez, *A Generalization of Band Joins and the Merge/Purge Problem*, IEEE Trans. on Knowledge and Data Engineering, 1996.

Lu et al., *Pipelined Band Join in Shared-Nothing Systems, Proc.* 1995 Asian Computing Science Conf., Dec. 1995, pp. 239-253.

Beebe, "Why are Epidemiologists Interested in Matching Algorithms?", National Cancer Institute, Record Linkage Techniques—1985: Proceedings of the Workshop on Exact Matching Methodologies, Arlington, VA, pp. 139-143 (May 9-10, 1985).

Boruch et al., "Exact Matching of Micro Data Sets in Social Research: Benefits and Problems", Record Linkage Techniques—1985: Proceedings of the Workshop on Exact Matching Methodologies, Arlington, VA, pp. 145-153 (May 9-10, 1985).

Scheuren,-"Methodologic Issues in Linkage of Multiple Data Bases", National Academy of Sciences, Panel on Statistics for an Aging Population (Sep. 13, 1985), reprinted Record Linkage Techniques—1985: Proceedings of the Workshop on Exact Matching Methodologies, Arlington, VA, pp. 155-178 (May 9-10, 1985).

Winkler, "Processing of Lists and String Comparison", Energy Information Administration, Record Linkage Techniques—1985: Proceedings of the Workshop on Exact Matching Methodologies, Arlington, VA, pp. 181-187 (May 9-10, 1985).

Jaro. "Current Record Linkage Research", U.S. Bureau of the Census, Record Linkage Techniques—1985: Proceedings of the Workshop on Exact Matching Methodologies, Arlington, VA, pp. 317-320 (May 9-10, 1985).

Smith, "Record-Keeping and Data Preparation Practices to Facilitate Record Linkage", Statistics Canada, Record Linkage Techniques—1985: Proceedings of the Workshop on Exact Matching Methodologies, Arlington, VA, pp. 321-326 (May 9-10, 1985).

Hill et al., "Generalized Iterative Record Linkage System", Statistics Canada, Record Linkage Techniques—1985: Proceedings of the Workshop on Exact Matching Methodologies, Arlington, VA, pp. 327-333 (May 9-10, 1985).

Howe at al., "A Generalized Iterative Record Linkage Computer System for Use in Medical Follow-up Studies", Computers and Biomedical Research 14, pp. 327, 240 (1981).

Lee, Joon Ho, "Combining Multiple Evidence from Different Properties of Weighting Schemes", Proceedings of the 18$^{th}$ Annual International ACM SIGIR Conference on Research and Development in Information Retrieval, Seattle, Washington, USA (Jul. 9-Jul. 13, 1995) pp. 180-188.

Fellegi, I., "Tutorial on the Fellegi-Sunter model for record linkage," Section II: Overview of applications and introduction to theory, pp. 127-138, 1985.

Haisten, M., "Designing a data warehouse," InfoDB, vol. 9, No. 2, pp. 2-9, 2004.

Li, W. et al., "Skew handling techniques in sort-merge join," ACM SIGMOD Jun. 4-6, 2002, Madison, Wisconsin.

Monge, A., "Matching algorithms within a duplicate detection system," Bulletin of the IEEE Computer Society Technical Committee on Data Engineering, pp. 1-7, 2000.

Scheuren, F. et al., "Recursive merging and analysis of administrative lists and data," 1996.

Winkler, W., "Advanced methods for record linkage," 1994.

Winkler, W., "Matching and record linkage," Business Survey Methods, Chapter 11, pp. 374-403, 1995.

Winkler, W., "Record linkage software and methods for merging administrative lists," Bureau of the Census Statistical Research Division, Statistical Research Report Series No. RR2001/03, report issued: Jul. 23, 2001.

Winkler, W., "The state of record linkage and current research problems," 1999.

Wang, G. et al., "Automatically detecting deceptive criminal identities," Communications of the ACM, vol. 47, issue 3, pp. 70-76, Mar. 2004.

* cited by examiner

POST-ANONYMOUS FUZZY COMPARISONS WITHOUT THE USE OF PRE-ANONYMIZATION VARIANTS

CROSS-REFERENCE TO RELATED APPLICATIONS

This application is related to the following co-pending and commonly-assigned applications:

U.S. patent application Ser. No. 10/702,624, filed on Nov. 6, 2003, by Jeffrey J. Jonas, entitled "CONFIDENTIAL DATA SHARING AND ANONYMOUS ENTITY RESOLUTION," which application was published as U.S. Patent Publication No. 2004-0210763, on Oct. 21, 2004, and which application claims the benefit under 35 U.S.C. §119 (e) to U.S. Provisional Patent Application Ser. No. 60/424,240, filed on Nov. 6, 2002, by Jeffrey J. Jonas, entitled "CONFIDENTIAL DATA SHARING AND ANONYMOUS ENTITY RESOLUTION;"

U.S. patent application Ser. No. 10/807,826, filed on Mar. 24, 2004, by Jeffrey J. Jonas and Steven B. Dunham, entitled "SECURE COORDINATE IDENTIFICATION METHOD, SYSTEM AND PROGRAM," which application was published as U.S. Patent Publication No. 2005-0066182, on Mar. 24, 2005, and which application claims the benefit under 35 U.S.C. §119(e) to U.S. Provisional Patent Application Ser. No. 60/457,119, filed on Mar. 24, 2003, by Jeffrey J. Jonas and Steven B. Dunham, entitled "SECURE COORDINATE IDENTIFICATION METHOD, SYSTEM AND PROGRAM;"

which applications are incorporated by reference herein.

BACKGROUND OF THE INVENTION

1. Field of the Invention

This invention relates to processing and retrieving data in a database and, more particularly, to processing and retrieving data in a confidential and anonymous manner.

2. Description of the Related Art

In the wake of Sep. 11, 2001 events, various parties (e.g., corporations, governmental agencies or natural persons) face a common dilemma: how can parties share specific information (e.g., a terrorist watch list, black list or a list of actual or potential problematic entities) that would assist the same or separate parties in detecting the presence of potential terrorists or other problematic parties, while maintaining the security and confidentiality of such information and separating any information that is not relevant to the matter?

Hesitation to contribute or otherwise disclose, as well as laws governing the use and disclosure of, certain information is predicated upon a concern that the information could be used in a manner that would violate privacy or otherwise cause damage to the party. Such damage could include identity theft, unauthorized direct marketing activities, unauthorized or intrusive governmental activities, protected class (e.g., racial, religious, gender, ethnic) profiling and discrimination, anti-competitive practices, defamation and/or credit or economic damage.

In response to this dilemma, or any situation requiring the sharing of confidential data, it would be beneficial to have a system wherein various parties may contribute data to an internal or external process or repository in a manner that: (a) sufficiently identifies each record in the data (e.g., a source and record number) without disclosing any entity-identifiable data (e.g., name or social security number); (b) prepares the data so: (i) identical and similar values can be compared regardless of source and (ii) such data can be transmitted in a standard, but confidential, format to protect the confidentiality and security of the data, (c) compares the data to previously contributed data while the data is still in the confidential format, (d) constructs an identifiable entity (such as by utilizing a persistent key and analyzing and enhancing the record with confidential representations of potential aliases, addresses, numbers and/or other identifying information) through matching of the compared data, (e) constructs related entities through an association of the compared data, and/or (f) generates messages for appropriate parties (such as with relevant record identifying elements, e.g., a source and record number), such messages sometimes sent in a confidential manner, such as: (i) on an interval basis and/or wherein at least one message is noise (e.g., a message that does not correspond with a match or relation, but is issued to minimize certain vulnerabilities corresponding with traffic pattern analysis) and (ii) after such message has been processed through a reversible cryptographic algorithm (e.g., encoding, encryption or other algorithm used to engender a level of confidentiality, but can be reversed, such as by using decoding or decryption). Notably, the decrypted message would contain the source and record number, not the underlying protected values.

Current systems use various means to transfer data in a relatively confidential manner within or between parties. For example, some current systems use a reversible cryptographic algorithm, which modifies the data in order to engender some level of confidentiality and lower the risk of losing data during transmission, prior to transmitting data with the understanding that the recipient will use a comparable decoding or decryption method (i.e., an algorithm that reverses, returns or modifies the encoded/encrypted data to a format representative of the original data) in order to decipher and understand the data. However, once the data is deciphered, such data is subject to analysis and use in a manner that could cause the very damage that the encoding/encryption process was intended to protect against.

Other current systems use irreversible cryptographic algorithms (e.g., a one-way function, such as MD-5 or other algorithm used to engender a level of confidentiality, but is irreversible) often as a document signature to make unauthorized document alteration detectable when the document is being shared across parties. Indeed, several existing irreversible cryptographic algorithms cause data to: (a) result in an identical unique value for the same data regardless of source and (b) be undecipherable and irreversible to protect the confidentiality and security of the data. Any minor alteration (such as an extra space) in the data results in a different value after the use of the irreversible cryptographic algorithm as compared with data that does not have the minor alteration, even if the data is otherwise the same. Some current systems utilize an irreversible cryptographic algorithm to process a portion of the data and then match and merge records on a one-to-one basis based upon identical processed data. For example, current systems in a hospital may process the social security numbers in electronic patient records through a one-way function and then match and merge records on a one-to-one basis in a database based upon the processed social security numbers.

However, there are no existing systems that, at a minimum: (a) match received data—after at least a portion of such received data is processed through a cryptographic algorithm (e.g., reversible cryptographic algorithm, such as encoding or decryption, or an irreversible cryptographic algorithm, such as a one-way function) with data previously stored in a database on a one-to-many or many-to-many basis (i.e., received data consists of one or more records that matches data previously stored in a database, the matched data previously stored in a database comprising more than one previously received record), limiting the ability in current systems to build upon identifiable entities while the data is still in a confidential format, (b) move beyond the initial match process to analyze whether any additional information is gained in the initial match and then match other data previously stored in a database based upon the additional information, further limiting the current systems ability to construct identifiable entities, (c) utilizing all or part of those functions identified in (a) and (b) in this paragraph, to match not only same entities, but associate various entities that are determined to be related in some manner (e.g., a passenger on an airline reservation list is a roommate of a natural person on an airline watch list) and/or (d) issue a plurality of messages wherein at least one of the plurality of messages is merely noise.

As such and in addition, there are no existing systems that can use the cryptographic algorithm to share and compare confidential data (including, without limitation, by leaving personally identifiable information in a cryptographic format), construct identifiable or related entities and message the appropriate entities in a manner that maintains security and confidentiality of the original data.

The present invention is provided to address these and other issues. Specifically, the present invention evaluates similarities via a synonym table post-encryption, whereas prior best practices involved the a priori generation of variants and included such variants in the original record.

SUMMARY OF THE INVENTION

To overcome the limitations in the prior art described above, and to overcome other limitations that will become apparent upon reading and understanding the present specification, the present invention discloses a method, apparatus, and article of manufacture for processing data. The method, apparatus and article of manufacture preferably comprise the steps of: (a) receiving a record having a plurality of identifiers into a computer system, the record corresponding to an entity; (b) encrypting one or more of the identifiers in the record to form an encrypted record; (c) applying one or more encrypted variants to the encrypted record based on the encrypted identifiers and pre-computed encrypted synonyms; and (d) comparing the encrypted record to previously stored data using the encrypted identifiers and the encrypted variants in order to the match or associate the encrypted record with the previously stored data.

The encrypted variants are applied using an encrypted synonym table. The encrypted synonym table is created by processing a synonym table using a cryptographic algorithm, wherein the synonym table includes the variants. In one embodiment, the variants may comprise name roots, date-of-birth transpositions, sound-alike equivalencies, language transliterations, or other synonyms.

The comparison of the encrypted record to the previously stored data may also comprise the step of assigning a persistent key to the encrypted record. The persistent key reflects an existing entity when the encrypted record matches the previously stored data. Alternatively, the persistent key reflects a new entity when the encrypted record does not match the previously stored data. In either instance, the encrypted record is matched with the previously stored data using fuzzy matching through the use of the encrypted identifiers and encrypted variants, without using pre-anonymization variants.

DETAILED DESCRIPTION OF THE INVENTION

While this invention is susceptible of embodiment in many different forms, there is shown in the drawing, and will be described herein in a detailed, specific embodiment thereof with the understanding that the present disclosure is to be considered as an exemplification of the principles of the invention and is not intended to limit the invention to the specific embodiment illustrated.

System Description

Figure 1:
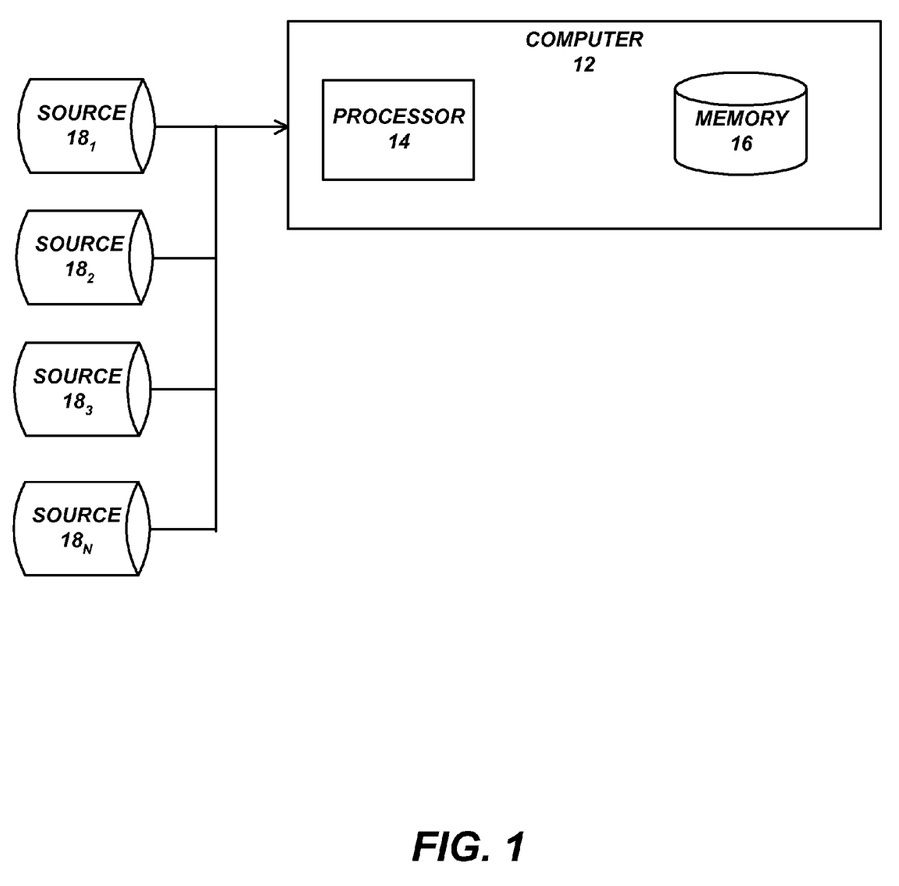
FIG. 1 is a block diagram of a data processing system for processing data prior to, and in, a database, according to the preferred embodiment of the present invention.

FIG. 1 is a block diagram of a data processing system 10 for processing data prior to, and in, a database, according to the preferred embodiment of the present invention. The system 10 includes at least one conventional computer 12 having a processor 14 and memory 16. The memory 16 is used both for storage of the executable software to operate the system 10 and for storage of the data in a database and random access memory. The computer 12 receives the data from one or more sources $18_1$-$18_N$ in the form of records and then processes each of the received records, as described in more detail below. The software is stored in the memory 16 and is processed or implemented by the processor 14.

The data from sources $18_1$-$18_N$ comprises one or more records having a plurality of identifiers. Each record corresponds with one or more entities. The one or more entities may be natural persons, organizations, personal property, real property, proteins, chemical or organic compounds, biometric or atomic structures, or other items that can be represented by identifying data. For example, a record that contains identifiers for name, employer name, home address, work address, work telephone number, home telephone number, car license plate number, car type and social security number may correspond with, at a minimum, the following entities: (a) natural person, (b) organization (e.g., employer or airline), and/or (c) property (e.g., car).

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Receive and Process Records

Figure 2:
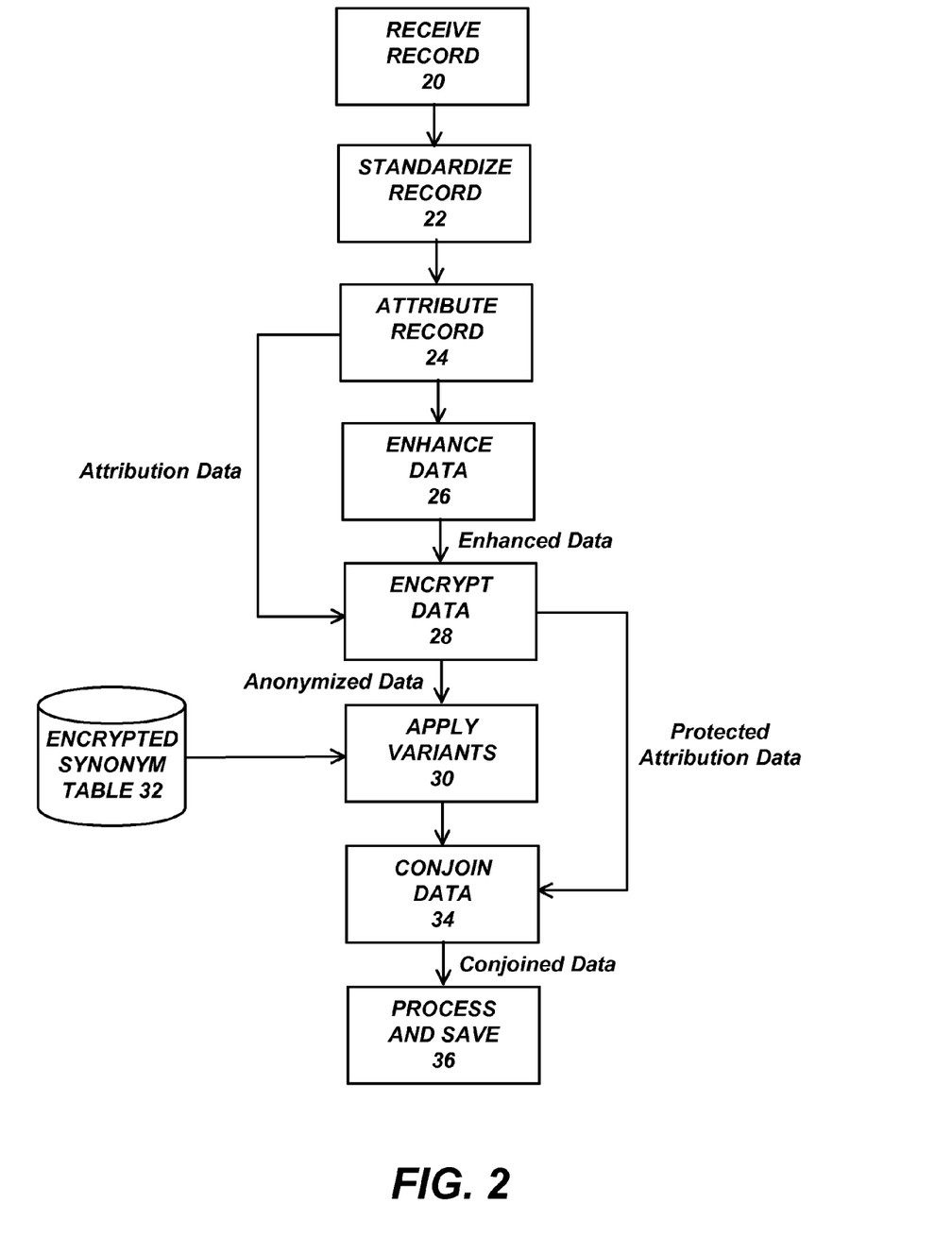
FIG. 2 is a flowchart that illustrates the steps performed by the system in receiving records and then processing each of the received records.

FIG. 2 is a flowchart that illustrates the steps performed by the system 10 in receiving records from sources $18_1$-$18_N$ and then processing each of the received records.

Block 20 represents the system 10 receiving one or more records from sources $18_1$-$18_N$, each of the records having a plurality of identifiers, into the computer system 10. In this embodiment, the received record corresponds to an entity.

If the received record is not in a standard format (e.g., XML), then Block 22 represents the system 10 converting the received record into a standard format.

Block 24 represents the system 10 identifying, assigning or otherwise attributing the record to a source $18_1$-$18_N$ (e.g., one or more identifiers that identifies the record in or to the source $18_1$-$18_N$, such as one or more primary keys of the record, such as an organization ID, system ID and record ID), wherein the identifiers attributed to the source of the received record are known as "Attribution Data." Alternatively, a coded cross-reference table is sometimes used whereby the Attribution Data is represented by an attribution key and the attribution key is used to locate the Attribution Value when necessary.

Figure 3:
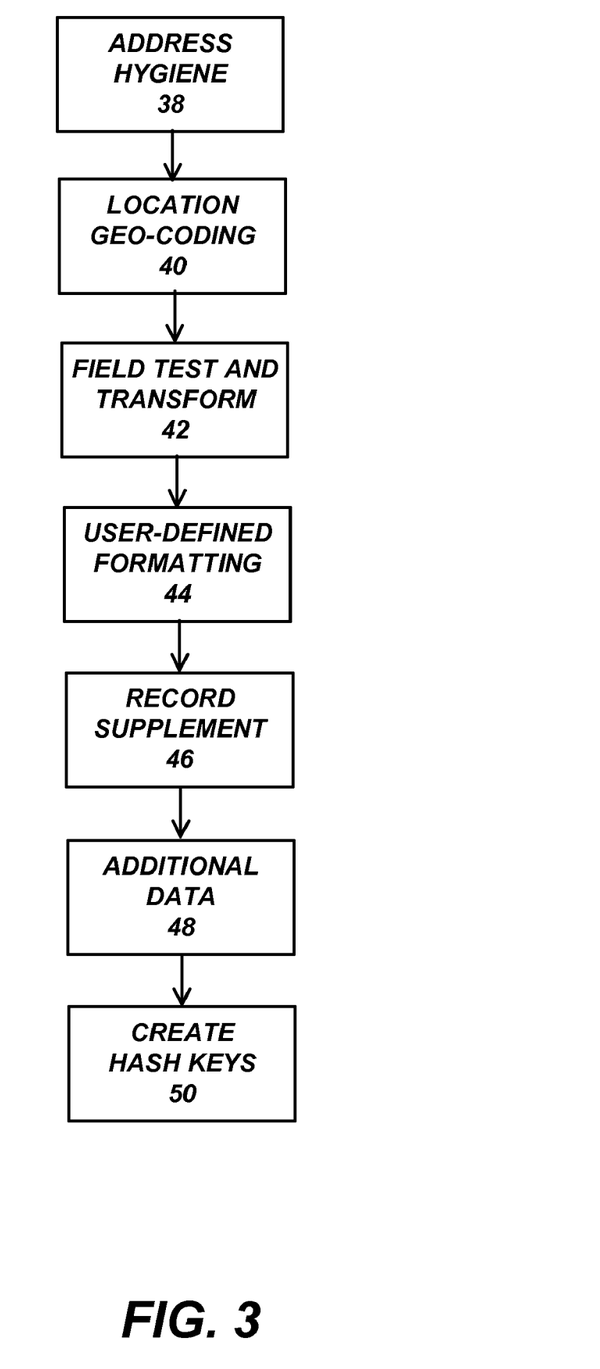
FIG. 3 is a flowchart that illustrates the steps performed by the system in analyzing and enhancing one or more of the plurality of identifiers of the received records.

Block 26 represents the system 10 processing the received record by analyzing and enhancing one or more of the plurality of identifiers therein, wherein the analyzed and enhanced identifiers of the record are known as "Enhanced Data." This Block is described in more detail in FIG. 3.

Block 28 represents the system 10 performing a cryptographic algorithm to encrypt or anonymize one or more of the identifiers in the record to form an encrypted record. Specifically, this step represents the system 10 processing all or part of the Enhanced Data and optionally all or part of the Attribution Data through one or more cryptographic algorithms, which may include using secret keys for protection and confidentiality, such as:

(a) utilizing an irreversible cryptographic algorithm (e.g., one-way function) to process the entity-identifiable Enhanced Data (the irreversible processed data being "Anonymized Data") wherein the secret key is a "salt" value to protect against dictionary attacks, and (b) sometimes utilizing a reversible cryptographic algorithm (e.g., encryption or encoding) to process the Attribution Data, wherein the reversible processed data is known as the "Protected Attribution Data" wherein the secret key is the decryption key necessary to reveal the owner of the data record).

Block 30 represents the system 10 applying one or more encrypted variants from an encrypted synonym table 32 to the anonymized identifiers, for inclusion in the encrypted record, wherein the encrypted variants are anonymized variants. Specifically, this Block, which is described in more detail in FIG. 4, applies encrypted variants based on pre-computed encrypted synonyms for inclusion with the Anonymized Data.

Block 34 represents the system 10 conjoining the Anonymized Data and the Protected Attribution Data, wherein the conjoined Anonymized Data and the Protected Attribution Data are known as the "Conjoined Data." Note that this Conjoined Data may also be further processed through a reversible cryptographic algorithm.

Block 36 represents the system 10 processing and/or saving the Conjoined Data in a Repository.

Note that this Repository may be stored in a location in memory 16 or may be stored in or on more local or remote storage locations on the system 10 or other devices. Indeed, the location of the Repository may be of lesser importance because the Conjoined Data in the Repository will be in a secure and confidential format. Furthermore, in this example, only the Attribution Data is susceptible to being reversed (e.g., decrypted or decoded) from the Conjoined Data. As such, even if an unauthorized party was able to reverse the Attribution Data, such party would be unable to access, read or otherwise evaluate the Anonymized Data. However, the entirety of the Conjoined Data may be used for comparison and identity recognition or correlation purposes, while maintaining confidentiality.

Block 36 may also represent the system 10 comparing the encrypted record to previously stored data in the computer system using the anonymized identifiers and encrypted variants, wherein the encrypted record is matched with the previously stored data, for example, in order to determine whether they reflect the same entity. In this regard, the Conjoined Data is compared with previously stored data (such as from other sources and potentially a warehouse of stored data) and matched to any data reflecting the same or related entities.

In addition, Block 36 may represent the system 10 storing the Conjoined Data and any resulting relations and/or matches, and optionally sending one or more messages, based upon user-defined rules, in response to the resulting relations and/or matches, such as: (i) on a set interval basis, (ii) sometimes including a message that is merely noise to minimize a traffic analysis attack, and/or (iii) with respect to the true messages, identifying Protected Attribution Data from matched data.

Analyze and Enhance Records

FIG. 3 is a flowchart that illustrates the steps performed by the system 10 in analyzing and enhancing one or more of the plurality of identifiers of the received records, wherein the analyzed and enhanced identifiers of the record are known as "Enhanced Data." Specifically, this flowchart illustrates the steps performed by the system 10 in comparing at least a portion of the identifiers of the received record to a user-defined criteria and/or rules to perform several functions, which are set forth below.

Block 38 represents the system 10 performing address hygiene (e.g., comparing to postal delivery standards).

Block 40 represents the system 10 performing location geo-coding (e.g., determining geographic locations, such as latitude and longitude coordinates).

Block 42 represents the system 10 performing field testing and transformations (e.g., comparing the gender field to confirm M/F and possibly transforming Male to M).

Block 44 represents the system 10 performing user-defined formatting (e.g., formatting all social security numbers in a 999-99-9999 format).

Block 46 represents the system 10 supplementing the received record by causing the system 10 to access one or more databases (which may contain the processing previously identified, thus causing the system to access additional databases in a cascading manner) to search for additional data.

Block 48 represents the system 10 adding the additional data to the received record (which may by submitted as new record(s) for receipt and processing).

Block 50 represents the system 10 creating and including hash keys for the subsequent cryptographic algorithms. The hash keys may comprise a combination of certain data in the received record, e.g., the first three letters of a rooted first name, first four letters of last name and last five numbers of a social security number.

Any new, modified or enhanced data can be stored in newly created fields to maintain the integrity of the original data. By analyzing and enhancing the identifiers in each record, identifiers corresponding with the same entity are more likely to match (either through the original identifiers or through the new, modified or enhanced data).

Variant Generation

Figure 4:
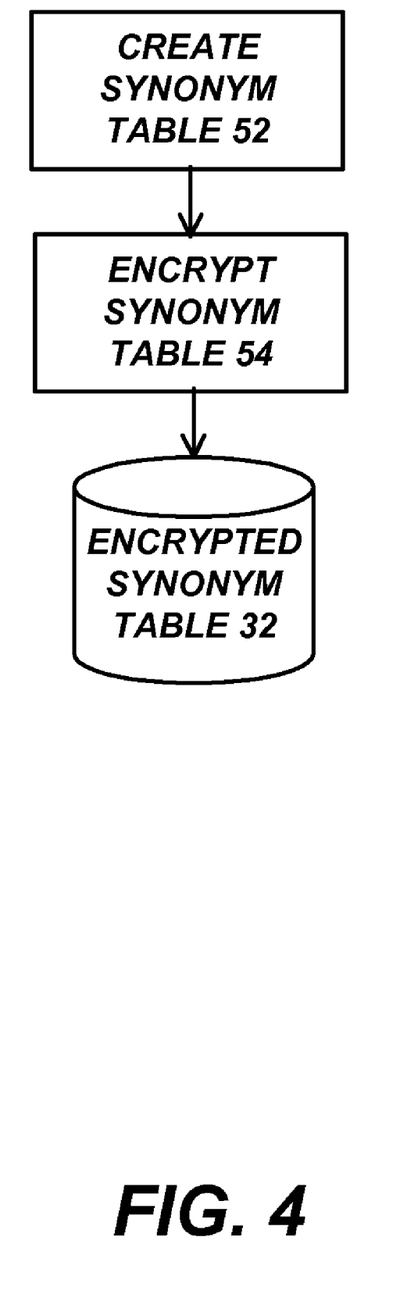
FIG. 4 is a flowchart that illustrates the steps performed by the system in the course of generating and encrypting variants.

FIG. 4 is a flowchart that illustrates the steps performed by the system 10 when generating and encrypting variants (e.g., common value alternatives or misspellings) for their inclusion with the Anonymized Data in the encrypted record. This provides for enhanced fuzzy matching in the anonymized domain, i.e., post-anonymous fuzzy comparisons without use of pre-anonymization variants.

The present invention applies variants after their anonymization. Previous anonymization techniques apply variants before their anonymization, such as described in U.S. patent application Ser. No. 10/702,624, filed on Nov. 6, 2003, by Jeffrey J. Jonas, entitled "CONFIDENTIAL DATA SHARING AND ANONYMOUS ENTITY RESOLUTION," which application was published as U.S. Patent Publication No. 2004-0210763, on Oct. 21, 2004, and which application claims the benefit under 35 U.S.C. §119(e) to U.S. Provisional Patent Application Ser. No. 60/424,240, filed on Nov. 6, 2002, by Jeffrey J. Jonas, entitled "CONFIDENTIAL DATA SHARING AND ANONYMOUS ENTITY RESOLUTION," which applications are incorporated by reference herein.

For example, previous anonymization techniques apply variants before anonymization for name standardization (e.g., comparing an input name to a root names list in order to standardize the input name). As a result, an input of "Bob" is expanded to include "Robert," and then both values are anonymized (e.g., irreversibly encrypted). This creates extra work for the system 10, expands the size of the record being submitted requiring more space and, when new pre-processing rules are changed (e.g., name rooting table updates), all parties must re-process their records.

The present invention, on the other hand, provides an alternative approach, that solves some fuzzy-matching scenarios (not completely negating current techniques, but rather augmenting them), involves encrypting or anonymizing both primary values and rooted values (e.g., names, day/month of birth dates, etc.) resulting in an encrypted synonym table.

Assume, for example, that "bob", "bobby" and "robert" are encrypted or anonymized as follows:

bob (encrypted)=>rx11y bobby (encrypted)=>77ef robert (encrypted)=>c676

First, a synonym table (also known as an equivalency table or similarities table) is created that associates variants "bob" with "robert" and "bobby" with "robert", and the synonym table is then encrypted using the irreversible cryptographic algorithm (e.g., one-way function) that is used during the Apply Variants process, in Block 30, wherein the variants within the encrypted synonym table are used to augment the encrypted record.

The encrypted variants applied using the encrypted synonym table as follows:

rx11y (variants)=>c676 (i.e., bob=>robert)

77ef (variants)=>c676 (i.e., bobby=>robert)

However, the present invention does require pre-computing the encrypted synonym table, using the same secret key (e.g., any combination of "salt", commutative encryption or other cryptographic technique) that are used with the Enhanced Data. On the other hand, the present invention will work for encrypted variants, such as encrypted name roots, date-of-birth transpositions, sound-alike equivalencies, etc.

Thus, in one embodiment, Block 52 represents the system 10 creating a synonym table including variants. The synonym table could contain variants comprising primary values, such as name roots, date-of-birth transpositions, sound-alike equivalencies, etc. These and other data types subject to the same kind of evaluations are loaded into the synonym table.

Block 54 represents the system 10 pre-processing the synonym table, by encrypting or anonymizing the variants contained therein, to create the encrypted synonym table 32. Thereafter, the system 10 applies the encrypted variants on all or part of the Anonymized Data using the encrypted synonym table 32, for inclusion in the Anonymized Data, as part of the Block 30 in FIG. 1.

Compare Conjoined Data to Previously Stored Data

As noted above, in Blocks 34 and 36 of FIG. 2, the system 10 compares the Conjoined Data with previously stored data, matches any data reflecting the same or related entities, stores the Conjoined Data and any resulting relations and/or matches, and optionally sends one or more messages in response to the resulting relations and/or matches.

For example, an identifier representing the social security number for a natural person type entity is helpful in differentiating between and across entities. In this regard, the system 10 would determine whether the identifier is generally distinctive across entities when performing the comparisons and matches. However, if the system 10 determines that the identifier is not to be considered a generally distinctive identifier, then the 10 system stops matching based upon the identifier and may un-match previous records that were matched based upon the identifier.

These steps are described in more detail in FIGS. 4-7 of U.S. patent application Ser. No. 10/702,624, filed on Nov. 6, 2003, by Jeffrey J. Jonas, entitled "CONFIDENTIAL DATA SHARING AND ANONYMOUS ENTITY RESOLUTION," which application was published as U.S. Patent Publication No. 2004-0210763, on Oct. 21, 2004, and which application claims the benefit under 35 U.S.C. §119(e) to U.S. Provisional Patent Application Ser. No. 60/424,240, filed on Nov. 6, 2002, by Jeffrey J. Jonas, entitled "CONFIDENTIAL DATA SHARING AND ANONYMOUS ENTITY RESOLUTION," all of which applications are incorporated by reference herein.

CONCLUSION

This concludes the description of the preferred embodiments of the present invention. The following describes some alternative embodiments for accomplishing the present invention. For example, any type of computer, such as a mainframe, minicomputer, or personal computer, or computer configuration, could be used with the present invention. In addition, many types of databases could benefit from the present invention.

For example, the techniques described herein may be used by any number of different data handling programs (e.g., semantic reconciliation; relationship awareness; data mining; pattern recognition; analysis; transcoding; other data conversion). Indeed, any anonymization matching engine, and all products that emerge in the "analytics in the anonymized data space" technology class could benefit from the present invention. Generally, any service proving anonymized data matching could benefit from this technique.

The foregoing description of embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method for processing data, comprising:
   (a) receiving a record having a plurality of identifiers into a computer system, the record corresponding to an entity;
   (b) encrypting one or more of the identifiers in the record to form an encrypted record;
   (c) applying one or more encrypted variants to the encrypted record using the encrypted identifiers to access pre-computed encrypted synonyms from an encrypted synonym table; and
   (d) comparing the encrypted record to previously stored data using the encrypted identifiers and the encrypted variants in order to the match or associate the encrypted record with the previously stored data, wherein the record is matched with the previously stored data using fuzzy matching through the use of the encrypted identifiers and encrypted variants, without using pre-anonymization variants.

2. The method of claim 1, further comprising the step of converting the record into a standardized message format.

3. The method of claim 1, further comprising the step of enhancing the record by formatting the identifiers in accordance with a user-defined standard.

4. The method of claim 1, wherein the step of comparing the encrypted record to the previously stored data further comprises the step of assigning a persistent key to the encrypted record.

5. The method of claim 4, wherein the persistent key reflects an existing entity when the encrypted record matches the previously stored data.

6. The method of claim 4, wherein the persistent key reflects a new entity when the encrypted record does not match the previously stored data.

7. The method of claim 1, wherein the encrypted variants comprise name roots, date-of-birth transpositions, sound-alike equivalencies, language transliterations, grid coordinates, or other synonyms.

8. The method of claim 1, wherein the encrypted synonym table is created by processing a synonym table using a cryptographic algorithm.

9. The method of claim 8, wherein the synonym table includes the variants.

10. An apparatus for processing data, comprising:
    a computer system;
    logic, performed by the computer system, for
    (a) receiving a record having a plurality of identifiers into a computer system, the record corresponding to an entity;
    (b) encrypting one or more of the identifiers in the record to form an encrypted record;
    (c) applying one or more encrypted variants to the encrypted record using the encrypted identifiers to access pre-computed encrypted synonyms from an encrypted synonym table; and
    (d) comparing the encrypted record to previously stored data using the encrypted identifiers and the encrypted variants in order to the match or associate the encrypted record with the previously stored data, wherein the record is matched with the previously stored data using fuzzy matching through the use of the encrypted identifiers and encrypted variants, without using pre-anonymization variants.

11. The apparatus of claim 10, further comprising logic for converting the record into a standardized message format.

12. The apparatus of claim 10, further comprising logic for enhancing the record by formatting the identifiers in accordance with a user-defined standard.

13. The apparatus of claim 10, wherein the logic for comparing the encrypted record to the previously stored data further comprises the logic for assigning a persistent key to the encrypted record.

14. The apparatus of claim 13, wherein the persistent key reflects an existing entity when the encrypted record matches the previously stored data.

15. The apparatus of claim 13, wherein the persistent key reflects a new entity when the encrypted record does not match the previously stored data.

16. The apparatus of claim 10, wherein the encrypted variants comprise name roots, date-of-birth transpositions, sound-alike equivalencies, language transliterations, or other synonyms.

17. The apparatus of claim 10, wherein the encrypted synonym table is created by processing a synonym table using a cryptographic algorithm.

18. The apparatus of claim 17, wherein the synonym table includes the variants.

19. A computer program product comprising a non-transitory useable medium including computer readable code, wherein the computer read code when executed by a computer causes the computer to perform a method for processing data, comprising:
    (a) receiving a record having a plurality of identifiers into a computer system, the record corresponding to an entity;
    (b) encrypting one or more of the identifiers in the record to form an encrypted record;
    (c) applying one or more encrypted variants to the encrypted record using the encrypted identifiers to access pre-computed encrypted synonyms from an encrypted synonym table; and
    (d) comparing the encrypted record to previously stored data using the encrypted identifiers and the encrypted variants in order to the match or associate the encrypted record with the previously stored data, wherein the record is matched with the previously stored data using fuzzy matching through the use of the encrypted identifiers and encrypted variants, without using pre-anonymization variants.

20. The article of claim 19, further comprising the step of converting the record into a standardized message format.

21. The article of claim 19, further comprising the step of enhancing the record by formatting the identifiers in accordance with a user-defined standard.

22. The article of claim 19, wherein the step of comparing the encrypted record to the previously stored data further comprises the step of assigning a persistent key to the encrypted record.

23. The article of claim 22, wherein the persistent key reflects an existing entity when the encrypted record matches the previously stored data.

24. The article of claim 22, wherein the persistent key reflects a new entity when the encrypted record does not match the previously stored data.

25. The article of claim 19, wherein the encrypted variants comprise name roots, date-of-birth transpositions, sound-alike equivalencies, language transliterations, or other synonyms.

26. The article of claim 19, wherein the encrypted synonym table is created by processing a synonym table using a cryptographic algorithm.

27. The article of claim 26, wherein the synonym table includes the variants.

* * * * *